United States Patent
Bang et al.

(10) Patent No.: US 9,992,664 B2
(45) Date of Patent: Jun. 5, 2018

(54) DETERMINING NETWORK CONNECTION STRUCTURE OF TARGET AREA

(71) Applicant: KT CORPORATION, Gyeonggi-do (KR)

(72) Inventors: Jae-Hyeok Bang, Gyeonggi-do (KR); Bong-Kwon Kang, Gyeonggi-do (KR); Tae-Gyun Kim, Gyeonggi-do (KR); Kyung-Deok Seo, Jeollabuk-do (KR)

(73) Assignee: KT CORPORATION, Gyeonggi-do (KR)

( * ) Notice: Subject to any disclaimer, the term of this patent is extended or adjusted under 35 U.S.C. 154(b) by 113 days.

(21) Appl. No.: 14/820,520

(22) Filed: Aug. 6, 2015

(65) Prior Publication Data

US 2016/0044494 A1    Feb. 11, 2016

(30) Foreign Application Priority Data

Aug. 6, 2014    (KR) .................. 10-2014-0100957

(51) Int. Cl.
*H04L 12/28* (2006.01)
*H04W 8/18* (2009.01)
*H04W 24/02* (2009.01)
*H04L 12/26* (2006.01)

(52) U.S. Cl.
CPC .......... *H04W 8/183* (2013.01); *H04W 24/02* (2013.01); *H04L 43/10* (2013.01)

(58) Field of Classification Search
CPC ..... H04L 41/12; H04L 12/4641; H04L 12/66; H04L 45/66; H04L 61/103; H04L 41/0853; H04L 43/0811; H04L 12/2807; H04L 29/12216; H04L 45/02; H04L 47/829; H04L 61/6022

See application file for complete search history.

(56) References Cited

U.S. PATENT DOCUMENTS 8,144,698 B2 *  3/2012  Sargor .............. H04L 29/12405
                                                 370/236
8,844,041 B1 *  9/2014  Kienzle .................. H04L 41/12
                                                 709/224
9,853,897 B2 * 12/2017  Song ..................... H04L 45/745
(Continued)

FOREIGN PATENT DOCUMENTS

JP      2010-187223 A     8/2010
KR    10-2006-0075325 A   7/2006
(Continued)

*Primary Examiner* — Michael J Moore, Jr.
(74) *Attorney, Agent, or Firm* — IP Legal Services, LLC

(57) ABSTRACT

The disclosure is related to determining a network connection structure of devices in a target service place by a service server including a processor and a memory and located at a remote location from the target service place. In order to determine, subscriber information of a target subscriber may be obtained. Based on the subscriber information, public network information associated with the target subscriber may be obtained from predetermined network devices associated with the target subscriber. First devices may be detected based on the obtained subscriber information and the collected network information, wherein the first devices are belonging to the target subscriber and are located in the target subscriber's service place.

18 Claims, 4 Drawing Sheets

(56) References Cited

U.S. PATENT DOCUMENTS

| | | | | |
|---|---|---|---|---|
| 2007/0022469 | A1* | 1/2007 | Cooper | H04K 1/00 726/3 |
| 2007/0248085 | A1* | 10/2007 | Volpano | H04L 12/4679 370/389 |
| 2008/0049779 | A1* | 2/2008 | Hopmann | H04L 12/2807 370/431 |
| 2008/0052384 | A1* | 2/2008 | Marl | H04L 12/2807 709/223 |
| 2009/0037562 | A1* | 2/2009 | Lobbert | H04L 29/12018 709/220 |
| 2010/0325730 | A1* | 12/2010 | Cyprus | H04L 63/0209 726/25 |
| 2011/0179158 | A1* | 7/2011 | Donnelly | H04L 67/18 709/224 |
| 2012/0324567 | A1* | 12/2012 | Couto | H04L 41/0853 726/12 |

FOREIGN PATENT DOCUMENTS

| KR | 10-2007-0042628 A | 4/2007 |
|---|---|---|
| KR | 10-2010-0138110 A | 12/2010 |
| KR | 10-1064473 B1 | 9/2011 |

* cited by examiner

DETERMINING NETWORK CONNECTION STRUCTURE OF TARGET AREA

CROSS REFERENCE TO PRIOR APPLICATIONS

The present application claims priority under 35 U.S.C. § 119 to Korean Patent Application No. 10-2014-0100957 (filed on Aug. 6, 2014).

BACKGROUND

The present disclosure relates determining a network connection structure of devices in a target service area from a remote location and, more particularly, to collecting basic network information in a target area and configuring a network map of the target service area based on the collected basic network information.

Typically, a user registers at a preferred service provider, as a subscriber, in order to have a communication service (e.g., Internet service). A subscriber subscribes an Internet service from a preferred Internet service provider and connects at least one of devices of the subscriber to a communication network using the Internet service. Through connection to the communication network, the subscriber is enabled to communicate with others, download files, remotely control other devices, and likes. When such a subscriber has a problem (e.g., connection problems), the subscriber typically calls a tech support located at a remote location for help. Then, the tech support tries to solve the subscriber's problem from the remote location. In order to determine and analyze the problem, the tech support needs to determine a network connection structure of a target place (e.g., home or office) of the subscriber.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, a network connection structure of a target service place may be determined from a remote location.

In accordance with another aspect of the present embodiment, a network structure map may be configured based on basic network information on devices in a target service place, which are collected from network devices of a corresponding service provider.

In accordance with still another aspect of the present embodiment, a target subscriber' devices may be inspected by collecting basic network information from associated network devices such as a L2 device and a L3 device, determining a network connection structure of the subscriber's devices based on the collected basic network information, and producing a network map of the target subscriber's device.

In accordance with at least one embodiment, a method may be provided for determining a network connection structure of devices in a target service place by a service server including a processor and a memory and located at a remote location from the target service place. The method may include obtaining subscriber information of a target subscriber, collecting public network information associated with the target subscriber from predetermined network devices associated with the target subscriber, and detecting first devices belonging to the target subscriber and located in the target subscriber's service place based on the obtained subscriber information and the collected network information.

The obtaining may include extracting identification information on the target subscriber from an inspection request message for requesting inspection of a service place of the target subscriber and obtaining the subscriber information based on the extracted identification information. The subscriber information may be collected and stored when the target subscriber registers for a communication service. The subscriber information may include identification information of the target subscriber, information on the predetermined network devices having at least one port allocated to the target subscriber. The identification information may include at least one of a telephone number, a subscriber number assigned by a corresponding service provider when the target subscriber registers for a corresponding communication service, and a physical address of the target service place.

The collecting the public network information may include determining a layer 2 (L2) device and a layer 3 (L3) device associated with the target subscriber, as the predetermined network devices, based on the obtained subscriber information of the target subscriber, and obtaining a multiple access control (MAC) address table from the determined L2 device and obtaining an address resolution protocol (ARP) table from the determined L3 device, as the public network information of the target subscriber.

The determining a L2 device and a L3 device may include obtaining information on an Internet Protocol address of the L2 device, information on the L3 device coupled to the L2 device, and information on at least one port of the L2 device allocated to the target subscriber.

The detecting may include determining a port allocated to the target subscriber based on the obtained subscriber information, selecting devices associated with the allocated port based on the collected public network information, and identifying the selected devices as the first devices belonging to the target subscriber and located in the target subscriber's service place. In the selecting, the collected public network information may include a multiple access control (MAC) address table having information on MAC addresses of devices coupled to at least one of the predetermined network devices and port numbers associated with the devices coupled to at least one of the predetermined network devices.

The method may further include obtaining private network information from at least one of the detected devices belonging to the target subscriber and detecting second devices belonging to the target subscriber and located in the target subscriber's service place based on the obtained private network information. The private network information may be a router's management table. The router's management table may include information on devices coupled to a router belonging to the target subscriber and target subscriber's service place.

The obtaining private network information may include determining whether the router is included in the first devices, collecting the private network information from the router when the router is included in the first devices, otherwise, generating a network connection structure table based on the first devices.

The method may further includes generating a network connection structure table based on the first devices and the second devices, inspecting the first devices and the second devices based on the generated network connection structure table, and updating and providing the network connection structure table based on the inspecting results of the first devices and the second devices.

The method may further include producing and providing a network connection map based on the network connection structure table.

The detecting may include determining Internet Protocol (IP) addresses of the detected first devices based on the collected public network information.

The determining may include finding the IP addresses of the detected first devices by comparing a multiple access control (MAC) address table and an address resolution protocol (ARP) table, which are included in the public network information.

The detecting may include obtaining a management table stored and managed by the service server and determining device types of the detected first devices based on the obtained management table and the collected public network information.

The method may further include determining whether a router is included in the target subscriber's service place and collecting private network information from the router and detecting second devices based on the collected private network information when the router is included.

The method may further include generating a network connection structure table based on the detected first devices, inspecting the first devices based on the generated network connection structure table, updating and providing the network connection structure table based on the inspecting results of the first devices and the second devices, and generating and providing a network connection structure map based on the updated network connection structure table.

The inspecting may include performing a ping test using Internet Protocol (IP) addresses of the first devices and determining an operation states of each one of the first devices based on the result of the ping test.

In accordance with another embodiment, a server may be provided for determining a network connection structure of devices in a target service place. The server may be configured to obtain subscriber information of a target subscriber, to collect public network information associated with the target subscriber from predetermined network devices associated with the target subscriber, to detect first devices belonging to the target subscriber and located in the target subscriber's service place based on the obtained subscriber information and the collected network information, to inspect the first devices based on the collected public network information, and to generate and provide a network connection structure table based on information on the detected first devices, the collected public network information, and the inspecting results of the first devices.

The server is further configured to determine whether a router is included in the first devices, to collect private network information from the router when the router is included in the first devices, to detect second devices coupled to the router based on the collected private network information, to inspect the second devices based on the collected public network information and the collected private network information, and to update and provide the network connection structure table based on information on the detected first devices, the detected second devices, the collected public network information, the collected private network information, and the inspecting results of the first devices and the second devices.

BRIEF DESCRIPTION OF THE DRAWINGS

The above and/or other aspects of some embodiments of the present invention will become apparent and more readily appreciated from the following description of embodiments, taken in conjunction with the accompanying drawings, of which.

DETAILED DESCRIPTION OF EMBODIMENTS

Figure 1:
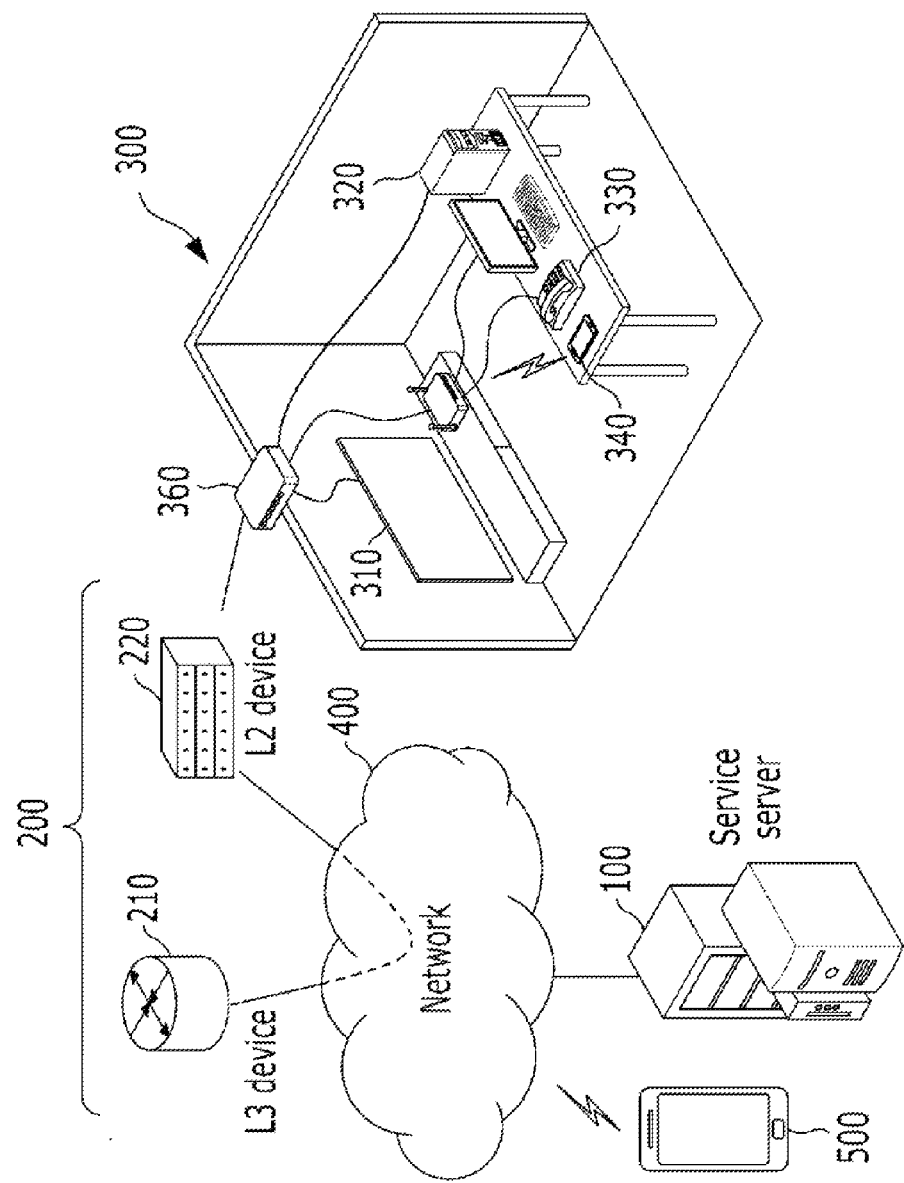
FIG. 1 illustrates a network environment where a service provider provides a communication service to a subscriber through a communication network in accordance with at least one embodiment.

Reference will now be made in detail to exemplary embodiments of the present invention, examples of which are illustrated in the accompanying drawings, wherein like reference numerals refer to like elements throughout. The embodiments are described below, in order to explain embodiments of the present invention by referring to the figures.

In accordance with at least one embodiment, i) basic network information on a subscriber's devices in a target service place may be collected from network devices of a corresponding service provider, ii) a hierarchical network connection structure of the devices may be configured based on the collected information, iii) a network map of the devices in the target service place may be produced based on the hierarchical network connection structure, and iv) the devices may be inspected based on the generated network map in accordance with at least one embodiment. Hereinafter, a network environment for inspecting a target subscriber's devices and an overall operation thereof will be described with reference to FIG. 1. Herein, a network connection structure of a target service area denotes a hierarchical connection relation among devices that are located in a predetermined limited area of a target subscriber and coupled to a communication network of a corresponding service provider. A subscriber denotes a user who subscribes a communication service (e.g., Internet service) from a preferred communication service provider. Furthermore, a service place may denote a limited area associated with the subscriber who wants to connect at least one device to a communication network for communicating with other devices through the communication network.

FIG. 1 illustrates a network environment where a service provider provides a communication service to a subscriber through a communication network in accordance with at least one embodiment.

Referring to FIG. 1, a communication service (e.g., Internet service) may be provided to devices 310 to 360 in a subscriber's service place 300 through a corresponding service provider's network devices 200 (e.g., L3 device 210 and L2 device 220) coupled in communication network 400. In such a network environment, service place 300 may denote a place of a subscriber, where the subscriber uses a communication service from a preferred service provider in order to connect various types of devices to communication network 400. The communication service may be the Internet service, and the service provider may be an Internet service provider, but the present embodiment is not limited thereto. Such a service place may be referred to a subscriber's personal network (e.g., local area network) for interconnecting devices within a limited area such as a residence, school, laboratory, or office building. Such service place 300 may be a residence or an office of a corresponding subscriber.

As shown in FIG. 1, service place 300 may include a plurality of devices, for example, Internet Protocol Television (IP TV) settop box 310, router 320, voice over Internet Protocol (VoIP) phone, 330, personal computer (PC) 340, and smart phone 350. Among the devices, IP TV settop box 310, router 320, and VoIP phone 330 may be provided by the service provider, as dedicated devices for enabling the subscriber to use one of subscribed communication services. Such provided devices 310, 320, and 330 may be coupled to network devices 200 through modem 360. Modem 360 may be a device that relays data communication between the network devices 200 and the subscriber's devices (e.g., 310 to 350).

Router 320 may be a device that forwards data packets between computer networks. For example, router 320 i) forms a private network (e.g., a local area network) by allocating a private IP address to devices coupled to the private network and ii) enables the coupled devices in the private network to communicate devices outside the private network. In particular, router 320 performs a network address translation (NAT) function, generates a NAT table as a result of performing the NAT function, and manages the generated NAT table. The NAT function may convert a private IP address to a public IP address or a Public IP address to a corresponding private IP address in order to enable devices inside the private network to communicate devices outside the private network. However, due to the private IP address, information on devices coupled to the private network of router 320 is not recorded in a MAC address table and/or an ARP table, which are generated and managed in network devices 200. Accordingly, devices in the service place and coupled to router 320 are invisible.

For example, router 320 may form a local area network (e.g., private network) with smart phone 340 and personal computer 350. That is, smart phone 340 and personal computer 350 are indirectly coupled to network device 200 through router 320 and modem 360. Smart phone 340 and personal computer 350 are invisible from outside the private network.

Network devices 200 may denote devices deployed by a corresponding communication service provider for facilitating the use of a computer network. Such network devices mediate data in a computer network. Network devices are also referred to as network equipment, network hardware, and network computing device. In accordance with at least one embodiment, network devices 200 may include layer 2 device (L2 device) 220, and layer 3 device (L3 device) 210, but the present embodiment is not limited thereto.

L2 device 220 may be a device performing a data link layer function among open system interconnection (OSI) 7 layer model. In particular, L2 device 220 perform data transmission between physical networks, physical addressing, error detection, frame delivery, and data flow control. L2 device 200 includes one port coupled to modem 360 of a specific subscriber (e.g., Internet cable).

For example, L2 device 220 may include a plurality of ports. When a user subscribes a communication service to a service provider, at least one of ports of L2 device 220 is allocated to the subscriber. Such allocation information may be stored with subscriber information (e.g., user information) in the service provider. Such an allocated port of L2 device 220 may be coupled to devices in the target service place through modem 360 of the target subscriber.

After allocating a predetermined port of L2 device 220 to the subscriber, L2 device 220 may obtain information on devices in the target service place upon generation of predetermined events. For example, L2 device 220 may obtain an MAC address of a device when the device is coupled to an allocated port of L2 device 220. L2 device 220 records the obtained MAC address in the MAC address table and manages the MAC address table in connection with at least one of a corresponding port and a respective subscriber. For example, Table 1 below exemplary illustrates a MAC address table stored in and managed by a L2 device.

L3 device 210 may perform operation related to a network layer function among a OSI 7 layer mode. In particular, L3 device 210 allocates an IP address to each device having a MAC address and manages the allocated IP address. For example, when L3 device 210 allocates an IP address to a device, maps the allocated IP address with a MAC address of the device, records the mapping information in the ARP table. That is, L3 device 210 may uses an address resolution protocol (ARP) for matching an IP address of each device coupled thereto and stores the result in the ARP table. That is, based on the ARP table, a MAC address of each device may be determined based on the IP address by referring to the ARP table. For example, Table 2 below exemplary illustrates an ARP table.

Service server 100 may be a computing system of a corresponding service provider, which responses to requests across a computer network, or help to provide, a predetermined service. In accordance with at least one embodiment, service server 100 may receive an inspection request message from at least one of a subscriber or a tech operator, collect basic network information of a target subscriber from network devices, determine a network connection structure of the target subscriber's devices, inspect the target subscriber's devices based on the determined network connection structure, and identifies a malfunctioning device among the devices.

In particular, service server 100 may obtains at least one of the MAC address table (e.g., Table 1) from L2 device 220, the ARP table (e.g., Table 2) from L3 device 210, a service server's management table (e.g., Table 3), and a router's management table (e.g., Table 6). Based on the collected basic network information, service server 100 may determine a network connection structure of the subscriber's devices and generates a network connection structure table (e.g., Table 4 or Table 7). Based on the network connection structure, service server 100 may inspect the subscriber's devices, produce a network connection map (e.g., FIG. 4), and provide such information to the subscriber or the tech operator. Such operation of management server 100 will be described with reference to FIG. 2 to FIG. 4.

As described, the inspection request message may be transmitted from the tech operator or the subscriber using a dedicated device (e.g., portable device 500). Such device 500 may include a smart phone, a computer, a laptop computer, a tablet, and a personal digital assistance (PDA). That is, such device 500 may be any electronic device having a certain level of a processing power, a memory, and a communication capability.

As described, service server 100 may collect basic information on a subscriber's devices in a target service place from network devices of a corresponding service provider, determine a hierarchical network connection structure of the devices based on the collected information, generate a network map of the devices in the target service place, and inspect the devices based on the generated network map in accordance with at least one embodiment. Such service server 100 may enable a technical operator (e.g., tech support) of a service provider to conveniently determine a network connection structure of devices in a target service place and detect a malfunctioning device among the subscriber's devices based on the determination result from a remote location. Such operation of service server 100 will be described in detail with reference to FIG. 2.

Figure 2:
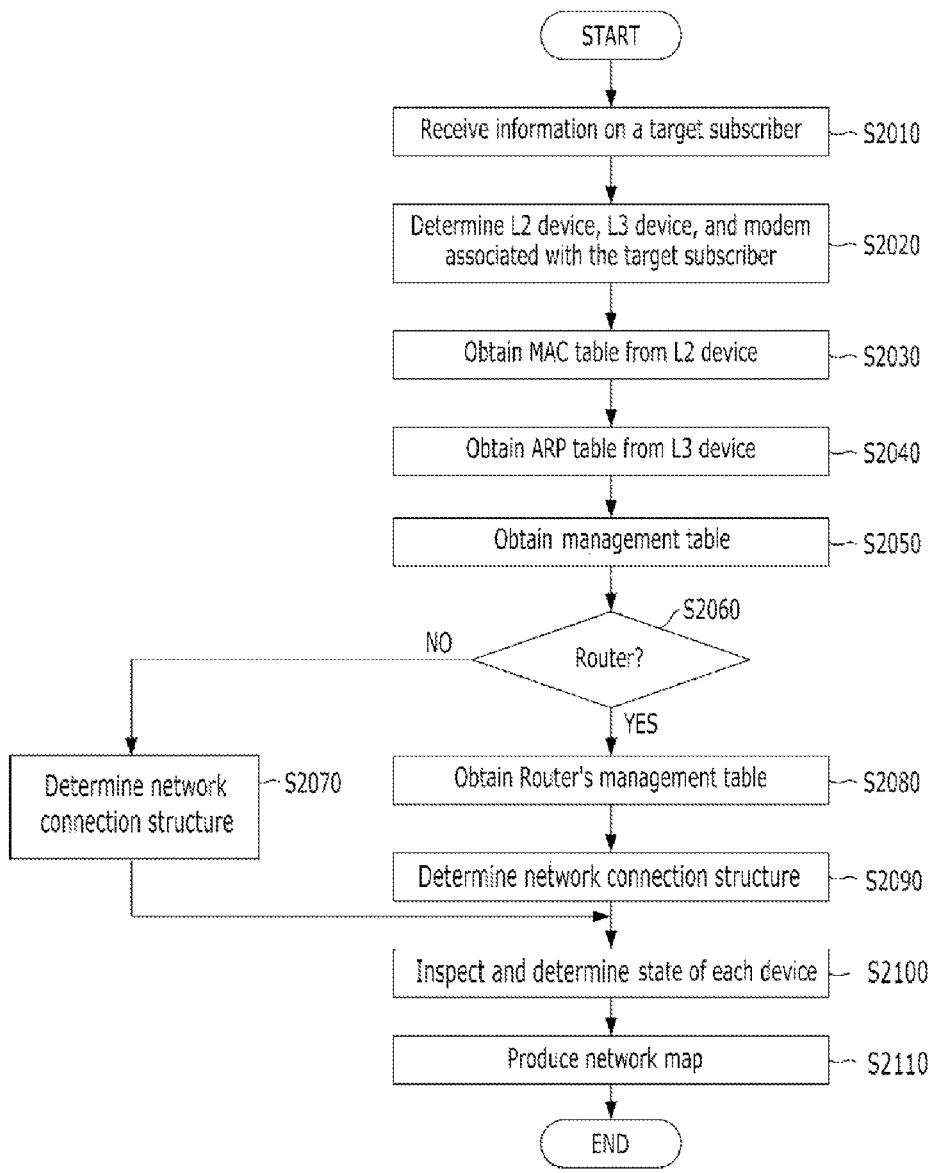
FIG. 2 illustrates a method for determining a hierarchical network connection structure of a subscriber's devices in a target service place and inspecting the subscriber's devices to detect a malfunctioning device among the subscriber's devices in the target service place in accordance with at least one embodiment.

FIG. 2 illustrates a method for determining a hierarchical network connection structure of a subscriber's devices in a target service place and inspecting the subscriber's devices to detect a malfunctioning device among the subscriber's devices in the target service place in accordance with at least one embodiment.

Referring to FIG. 2, an inspection request message for inspecting a service place of a target subscriber may be received at step S2010. For example, service server 100 may receive an inspection request message from a terminal of a service operator (e.g., a tech support) or from a target subscriber upon generation of a predetermined event.

Such an inspection request message may include information on a target subscriber and information on a reason for inspection. The information on a target subscriber may include information on identification of the target subscriber (e.g., subscriber's reference number, customer number, or social secret number), a telephone number (e.g., cell phone number, residence telephone number, office telephone number, Voice over IP telephone number), an address of a target service place (e.g., physical address: home address, office address, or building address), an Internet Protocol (IP) address of a L2 device having a port allocated to an associated subscriber, a number of a port allocated to the associated subscriber who requests the inspection, and an IP address of one of devices provided by a corresponding service provider in a target service place where the target subscriber connects devices to communication network 400 using a predetermined communication service from the service provider.

Such an inspection request message may be generated by a dedicated hardware device or a dedicated software program installed in and executed by a computing device associated with a service operator (e.g., tech support of a service provider) or a subscriber. The generated inspection request message may be transmitted from a designated terminal of a service operator to service server 100. Such a designated terminal may be a computing device designed for remotely inspecting, controlling, and managing devices in a subscriber's end or a tech support's end. The designated terminal (e.g., device 500) may include various types of a computing device, such as a desktop computer, a laptop computer, a tablet, and a smart phone, which are installed with a designated application for inspecting a target service place. For example, a dedicated application may be downloaded from service server 100 to a portable electronic device (e.g., smart phone 340 or 500) of a tech support or a target subscriber, installed in the portable electronic device, and executed in response to a predetermined input. Furthermore, the inspection request message is generated as a result of the execution and transmitted to service server 100.

Furthermore, such an inspection request message may be generated and transmitted by the designated terminal of the service operator, for example, but not limited to, when a subscriber requests inspection, when a subscriber reports errors in an associated service place, when a subscriber complains about a disconnection problem in an associated service place, when a subscriber report difficulties of using a communication service (e.g., Internet service) in a target subscriber's service place (e.g., home or office), and when a subscriber requests to inspect or to detect a malfunctioning device in the target subscriber's service place. That is, in response to such a request from a subscriber, service server 100 receives the inspection request message for inspecting a target service place from the designated terminal (e.g., device 500 or smart phone 340).

At step S2020, service provider's network devices may be determined. For example, service server 100 may extract information on the target subscriber who requests the inspection and the target service place where the target subscriber have devices for receiving the communication service from the received inspection request message and determine associated network devices used for providing a communication service to the target subscriber.

The network devices denote a device owned and deployed by a service provider for providing a communication service to the target subscriber. For example, such a network device may include a Layer 2 (L2) device and a Layer 3 (L3) device. In particular, service 100 determines L3 device 210 and L2 device 220 as the associated network devices of target service place 300 in accordance with at least one embodiment.

In particular, service server 100 may obtain subscriber information of each subscriber. Such subscriber information of each subscriber may be stored in service server 100 or an independent server of a service provider. Such subscriber information may be collected and stored when a subscriber registers for the communication service, regularly updated upon generation of predetermined events, and constantly managed for providing a stable service. The subscriber information may include information on a respective subscriber, a port of a L2 device, which is allocated to a corresponding subscriber, the L2 device, and a L3 device coupled to the L2 device. Based on such subscriber information, service server 100 determines a port of L2 device 220, allocated to the target subscriber in accordance with at least one embodiment. Alternatively, information in the inspection request message may be used to determine the network devices. For example, as described, the inspection request message may include information on the target subscriber or information on a port of a L2 device, which is allocated to the target subscriber. Based on such information, service server 100 may determine the network devices of the corresponding service provider for providing a communication service to the target subscriber. Based on the determined network devices, service server 100 may collect public network information of the target subscriber from the determined network devices. Such public network information may include a MAC address table and an ARP table obtained from a L2 device and a L3 device.

At step S2030, a MAC address table may be obtained from a L2 device. For example, service server 100 obtains information on a MAC address table from the determined L2 device (e.g., L2 device 220) in accordance with at least one embodiment. In particular, service server 100 may transmit, to L2 device 220, a request message for the MAC address table stored or managed by L2 device 220. Furthermore, service server 100 may transmit a control message for fetching the MAC address table. The request message may include information on the target subscriber or the target service place to require information on MAC address table associated with the target subscriber. In response to the request message, L2 device 220 may provide information on the MAC address table associated with target service place 300 to service server 100. The control message may include information on instructions of L2 device 220 to read the MAC address table and transmit the read MAC address table back to service server 100.

The MAC address table includes MAC address of devices coupled to at least one of ports of L2 device 220. That is, the MAC address table also includes MAC address of subscriber's devices, which are coupled to the allocated port of L2 device 220, through modem 360, as shown in Table 1 below.

TABLE 1

| L2 device's MAC address table | |
|---|---|
| MAC address of subscriber's device | L2 device's Port No. |
| 00:01:02:03:04:05 | 3 |
| AB:CD:EF:02:03:04 | 3 |

Table 1 exemplary illustrates a MAC address table stored in and managed by a L2 device. As shown in Table 1, the MAC address table includes information on MAC addresses and port numbers allocated to devices coupled to L2 device 220. Based on the port number (e.g., port No. 3), devices in the target subscriber's service place (e.g., home 300) may be identified. For example, L2 device 220 may include a plurality of ports. When a user subscribes a communication service to a service provider, at least one of ports of L2 device 220 is allocated to the subscriber. Such allocation information may be stored with subscriber information (e.g., user information) in the service provider. Such an allocated port of L2 device 220 may be coupled to devices in the target service place through modem 360 of the target subscriber. After allocating a predetermined port of L2 device 220 to the subscriber, L2 device 220 may obtain information on devices in the target service place upon generation of predetermined events. For example, L2 device 220 may obtain an MAC address of a device when the device is coupled to an allocated port of L2 device 220. L2 device 220 records the obtained MAC address in the MAC address table and manages the MAC address table in connection with at least one of a corresponding port and a respective subscriber.

Service server 100 may obtain subscriber information of each subscriber. Such subscriber information of each subscriber may be stored in service server 100 or an individual server of a service provider. Such subscriber information may be collected and stored when a subscriber registers for the communication service and update upon generation of predetermined events. The subscriber information may include information on a respective subscriber, a port of a L2 device, which is allocated to a corresponding subscriber, the L2 device, and a L3 device coupled to the L2 device.

Based on such subscriber information, service server 100 determines a port of L2 device 220, allocated to the target subscriber, requests a MAC address table in L2 device 220, and determines the target subscriber' devices based on the port number allocated to the target subscriber in accordance with at least one embodiment.

In particular, based on the obtained MAC table (e.g., a port number and a MAC address), service server 100 may be aware of devices located in a target service place and directly coupled to L2 device 220 through modem 360. Such devices located in the target service place and belonging to the target subscriber may be referred to as subscriber devices, hereinafter. For example, as shown in Table 1, service server 100 may be aware of that two devices are located in the target service place based on the port number (e.g., 3) allocated to the target subscriber and detect the MAC addresses of two devices in accordance with at least one embodiment.

At step S2040, an address resolution protocol (ARP) table may be obtained from a L3 device. For example, service server 100 may determine information on a L3 device associated with the target subscriber based on the subscriber information, which might be stored in service server 100 or in other dedicated server of the corresponding service provider.

Service server 100 may transmit a request message to L3 device 210 to provide an ARP table associated with the target subscriber. In response to the request message, L3 device 210 may transmit information on the ARP table associated with the target subscriber. As for another example, service server 100 may transmit a control signal to L3 device 210 to fetch the ARP table and transmit the fetched ARP table back to service server 100. Table 2 exemplary illustrates an address resolution protocol (ARP) table.

TABLE 2

| L3 device's ARP table | |
|---|---|
| IP Address allocated to devices | MAC address of devices |
| 10.1.1.1 | 00:01:02:03:04:05 |
| 10.1.1.2 | AB:CD:EF:02:03:04 |

As shown in Table 2, such an ARP table includes information on an MAC address of a device and a corresponding IP address allocated thereto. As described, L3 device 210 allocates an IP address to each device having a MAC address and manages the allocated IP address. That is, L3 device 210 uses an address resolution protocol for finding an IP address of a device based on a MAC address of the device based on the ARP table. For example, when L3 device 210 allocates an IP address to a device, maps the allocated IP address with a MAC address of the device, records the mapping information in the ARP table.

Service server 100 may detect an IP address allocated to each subscriber device based on the MAC address thereof using the obtained ARP table. For example, based on the MAC address table, service server 100 detects two subscriber devices in the target service place and the MAC address thereof. Based on the MAC addresses of devices, service server 100 may detect IP addresses of the devices using the obtained ARP table. As described, based on the MAC address table and the ARP table, service server 100 may detect the subscriber devices, the MAC addresses thereof, and the IP addresses thereof in accordance with at least one embodiment.

At step S2050, a management table of a service provider may be obtained. For example, service server 100 may obtain a management table of a service provider that provides a communication service (e.g., Internet service) to the target subscriber. Such a management table of the service provider may include information on devices given (e.g., provided) to respective subscribers for a predetermined communication service. Such devices may include an IP TV settop box, a router (e.g., home or office router), a VoIP phone, and so forth. The management table may also include information on MAC addresses, types, and specifications of respective devices provided by a service provider to subscriber. Service server 100 may store and manage the management table of the service provider or may obtain the management table from an independent server associated with the service provider through a communication network. For example, an Internet service provider may provide an IPTV terminal (e.g., settop box), an Internet telephone (e.g., VoIP phone), or a router to a target place of a service subscriber. In this case, service server 100 may record such information (e.g., a type and a MAC address of a device) in the management table and manage the management table. Table 3 exemplary shows a management table in accordance with at least one embodiment.

TABLE 3

Service server's Management table

| Subscriber No. | Type of subscriber device | MAC address of subscriber device |
| --- | --- | --- |
| 1200 (John Park) | IP TV settop box | 00:01:02:03:04:05 |
| | Router | AB:CD:EF:02:03:04 |
| | VoIP telephone | 98:76:54:32:10:AA |
| 1201 (Kelly Kim) | Router | AD:ED:GF:03:05:07 |
| | VoIP telephone | 09:67:34:43:15:AB |

As shown in Table 3, the management table may include information a subscriber number with name and a type and a MAC address of each subscriber device. Since the management table has the MAC address of each subscriber device and service server 100 already detects the MAC addresses of active subscriber devices based on the MAC address table, service server 100 may determine a type of the detected active subscriber device based on the management table (table 3). For example, service server 100 determines that two active subscriber devices having MAC addresses of 00:01:02:03:04:05 and AB:CD:EF:02:03:04 are IP TV settop box 310 and router 320.

At step S2060, determination may be made so as whether a router is included in the target subscriber's service place. For example, service server 100 may determine whether a router is included in target service place 300 based on the obtained management table (e.g., Table 3). As described, a router is a network device that forwards data packets between computer networks. In particular, the router performs a network address translation (NAT) function and manages a NAT table. The NAT function may converts a private IP address to a public IP address or a Public IP address to a corresponding private IP address. Basically, a router forms a local area network using private IP addresses. Due to the private IP address, information on devices coupled to a local area network of the router is not recorded in the MAC address table and/or the ARP table. Accordingly, devices in the target service place and coupled to L2 device 220 through the router are invisible. In order to detect all of active devices in the target service place, service server 100 may need to detect devices coupled to the router.

When the router is not included (No-S2060), a network connection structure table may be produced at step S2070. For example, service server 100 may generate a network connection structure table based on the obtained MAC address table, the obtained ARP table, and the management table. Since the router is not included in the target service place, service server 100 may detect all of active devices in the target service place based on the MAC address table (e.g., Table 1), the ARP table (e.g., Table 2), and the management table (e.g., Table 3). Table 4 exemplary shows a network connection structure table in accordance with at least one embodiment.

TABLE 4

Network connection structure table

| L2 device | Port No. | MAC address | IP address | Device Type | Hierarchical Location |
| --- | --- | --- | --- | --- | --- |
| 1.1.1.2 | 3 | 00:01:02:03:04:05 | 10.1.1.1 | IP TV settop box | Direct |
| 1.1.1.2 | 3 | 98:76:54:32:10:AA | 10.1.1.2 | VoIP telephone | Direct |

As shown, the network connection structure table includes information on active subscriber devices in a target service place, such as an associated L2 device (e.g., L2 device 220), a port number allocated to the target subscriber, MAC addresses of detected active subscriber devices, IP addresses of detected active subscriber devices, types of the detected active subscriber devices, and hierarchical locations of each active subscriber device. For example, since there is no a router included in the target service place, all the detected active subscriber devices are directly connected to L2 device 220 through modem 360. Such devices may be indicated as "Direct" in a field of Hierarchical location in the network connection structure table. For example, when a device is coupled to a modem through a router, such a device may be indicated as "Indirect" or "under-hub" in the field of Hierarchical location in the network connection structure table.

At step S2100, an operation state of each subscriber device may be determined. For example, service server 100 may perform a predetermined inspection operation to determine an operation state of a subscriber device operation, such as a normal state, an abnormal state, a malfunction state, a turn-on state, a turn-off state, an idle state, and so forth. In particular, service server 100 may perform a ping test using an IP address of each subscriber device based on the network connection structure table (e.g., Table 4).

At step S2110, a network connection map may be produced and provided to a designated person. For example, service server 100 may update the determined operation state of each subscriber device as shown in Table 5 below.

TABLE 5

Network connection structure table update with operation state

| L2 device | Port No. | MAC address | IP address | Device Type | Hierarchical Location | Operation state |
|---|---|---|---|---|---|---|
| 1.1.1.2 | 3 | 00:01:02:03:04:05 | 10.1.1.1 | IP TV settop box | Direct | Normal |
| 1.1.1.2 | 3 | 98:76:54:32:10:AA | 10.1.1.2 | VoIP telephone | Direct | Abnormal |

Figure 4:
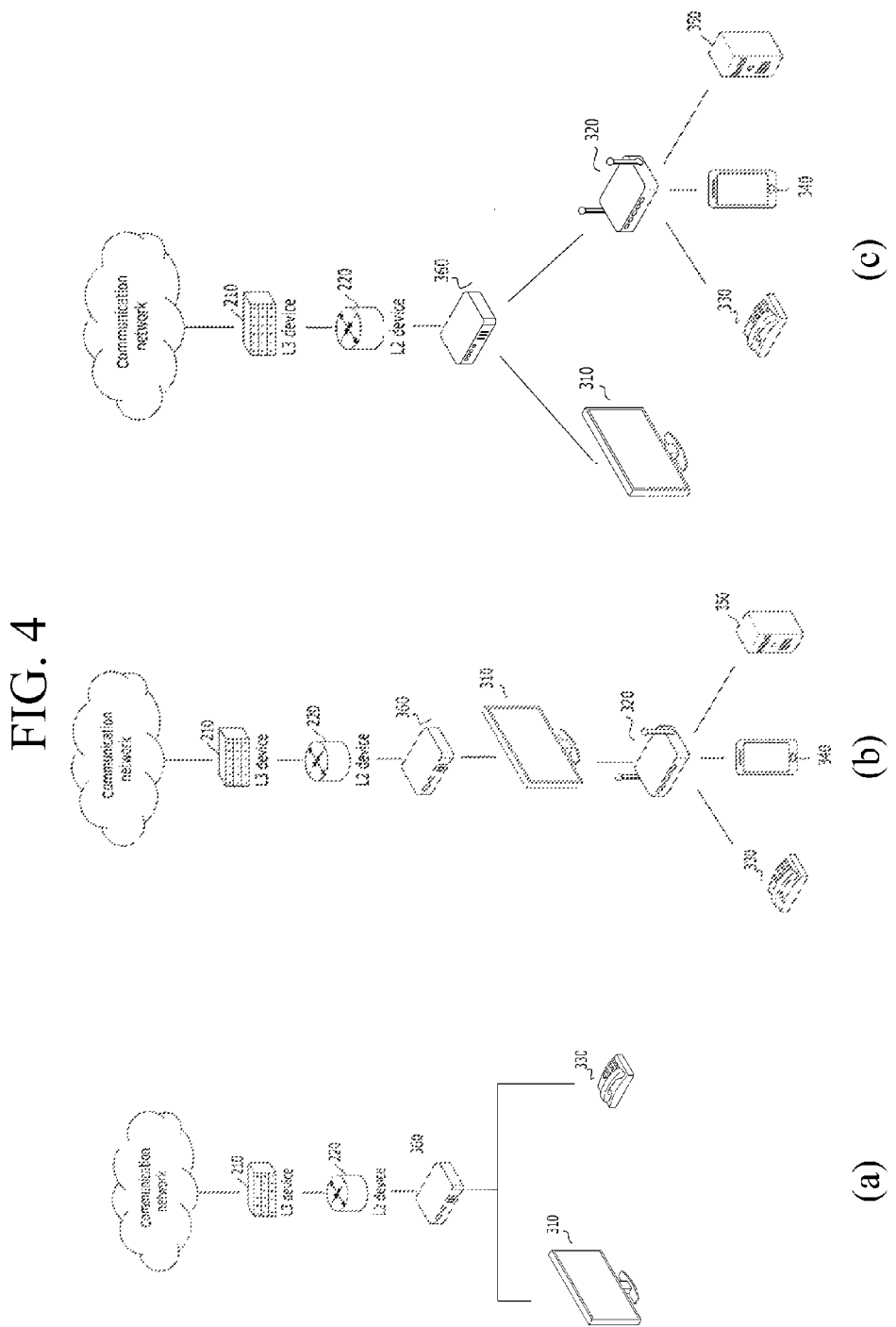
FIG. 4 illustrates a network connection map produced by a service server based on basic network information of devices in a target service place in accordance with at least one embodiment.

Based on the updated network connection structure table (e.g., Table 5), service server 100 may produce a network connection structure map as shown in FIG. 4. In particular, since no router is included in the target service place, a network connection structure map (a) may be produced as shown in a diagram (a) of FIG. 4. That is, the diagram (a) of FIG. 4 illustrates a network connection structure map. As shown, IP TV settop box 310 and VoIP telephone 330 are directed connected to modem 360. Each one of settop box 310 and VoIP telephone 330 may be highlighted or have different color indicating an operation state thereof, such as a normal state or an abnormal state. After the generation, the network connection structure map of FIG. 4 and the network connection structure table may be provided to the tech operator or the subscriber.

Referring back to S2060, when the router is included (Yes-S2060), a router management table may be obtained at step S2080. That is, when the router is included, service server 100 may obtain private network information of the target subscriber. The private network information may include the router's management table. For example, service server 100 may determine information on router 320 in the target service place based on based on the MAC address table (e.g., Table 1), the ARP table (e.g., Table 2), and the management table (e.g., Table 3). The information on router 320 may be an IP address. Service server 100 may transmit a request message to router 320 to provide a router's management table. In response to the request message, router 320 may transmit information on the router's management table. As for another example, service server 100 may transmit a control signal to router 320 to fetch the router's management table and transmit the fetched router's management table back to service server 100. Table 6 exemplary illustrates a router's management table.

TABLE 6

Router's management table

| MAC address of devices coupled to router | Private IP Address allocated to devices coupled to router | Port allocated to devices coupled to router |
|---|---|---|
| 98:76:54:32:10:AA | 192.168.100.1 | KT_WLAN_FFFF |
| 32:23:64:F3:E2:D7 | 192.168.100.2 | LAN1 |
| 35:67:89:32:F9:GH | 192.168.100.3 | LAN1 |

As shown in Table 6, such a router's management table includes information on an MAC address of a device (e.g., smart phone 340, VoIP phone 330, and personal computer 360) coupled to a router (e.g., 320), a corresponding private IP address allocated thereto, and a port allocated thereto. As described, router 320 allocates a private IP address to each device coupled to router 320 and performs a NAT function. For example, when router 320 allocates a private IP address to a device, maps the allocated IP address with a MAC address of the device, records the mapping information in the router's management table, and manages the router's management table.

Based on the obtained router's management table (e.g., Table 6), service server 100 may detect devices 330, 320, and 360, which are coupled to router 320. Furthermore, based on the MAC addresses of the detected devices 330, 320, and 360, service server 100 may determine whether each device is a device provided by a service provider or not. That is, by comparing the MAC address in the router's management able (e.g., Table 6) and the MAC address in the service server's management table (e.g., Table 3), service server 100 may determine whether a device is provided by a service server and also determine a type of a device. Furthermore, based on the obtained router's management table (e.g., Table 6), service server 100 may determine a hierarchical location of devices in the target service place in more detail.

At step S2090, a network connection structure table may be produced. For example, service server 100 may generate a network connection structure table based on the obtained MAC address table, the obtained ARP table, the service server's management table, and the router's management table. Since the router is included in the target service place, service server 100 may detect all of active devices in the target service place based on the router's management table (e.g., Table 6) in addition to the MAC address table (e.g., Table 1), the ARP table (e.g., Table 2), and the management table (e.g., Table 3). Table 7 exemplary shows a network connection structure table generated using the router's management table in addition to the MAC address table, the ARP table, and the service server's management table in accordance with at least one embodiment.

TABLE 7

Network connection structure table

| L2 device | Port No. | MAC address | IP address | Device Type | Hierarchical Location |
|---|---|---|---|---|---|
| 1.1.1.2 | 3 | 00:01:02:03:04:05 | 10.1.1.1 | IP TV settop box | Direct |
| 1.1.1.2 | 3 | 98:76:54:32:10:AA | 10.1.1.2 | Router | Direct |
| 1.1.1.2 | 3 | 98:76:54:32:10:AA | 192.168.100.1 | VoIP telephone | Indirect |
| 1.1.1.2 | 3 | 32:23:64:F3:E2:D7 | 192.168.100.2 | Not available | Indirect |
| 1.1.1.2 | 3 | 35:67:89:32:F9:GH | 192.168.100.3 | Not available | Indirect |

As shown, the network connection structure table includes information on active subscriber devices in a target service place having a private network, such as an associated L2 device (e.g., L2 device 220), a port number allocated to the target subscriber, MAC addresses of detected active subscriber devices, IP addresses of detected active subscriber devices, types of the detected active subscriber devices, and hierarchical locations of each active subscriber device. For example, since there is router 320 included in the target service place, the detected active subscriber devices are directly connected to L2 device 220 through modem 360 and indirectly connected through router 320. Such directed connected devices may be indicated as "Direct" in a field of Hierarchical location in the network connection structure table. The in-directed connected device may be indicated as "Indirect" or "under-hub" in the field of Hierarchical location in the network connection structure table.

At step S2100, an operation state of each subscriber device may be determined. For example, service server 100 may perform a predetermined inspection operation to determine an operation state of a subscriber device operation, such as a normal state, an abnormal state, a malfunction state, a turn-on state, a turn-off state, an idle state, and so forth. In particular, service server 100 may perform a ping test using an IP address of each subscriber device based on the network connection structure table (e.g., Table 7).

At step S2110, a network connection map may be produced and provided to a designated person. For example, service server 100 may update the determined operation state of each subscriber device as shown in Table 8 below.

TABLE 8

Network connection structure table updated with operation state

| L2 device | Port No. | MAC address | IP address | Device Type | Hierarchical Location | Operation state |
|---|---|---|---|---|---|---|
| 1.1.1.2 | 3 | 00:01:02:03:04:05 | 10.1.1.1 | IP TV settop box | Direct | Normal |
| 1.1.1.2 | 3 | 98:76:54:32:10:AA | 10.1.1.2 | Router | Direct | Abnormal |
| 1.1.1.2 | 3 | 98:76:54:32:10:AA | 192.168.100.1 | VoIP telephone | Indirect | Normal |
| 1.1.1.2 | 3 | 32:23:64:F3:E2:D7 | 192.168.100.2 | Not available | Indirect | Normal |
| 1.1.1.2 | 3 | 35:67:89:32:F9:GH | 192.168.100.3 | Not available | Indirect | Normal |

Based on the updated network connection structure table (e.g., Table 8), service server 100 may produce a network connection structure map as shown in FIG. 4. In particular, since a router is included in the target service place, a network connection structure map (b) may be produced as shown in a diagram (b) or a diagram (c) of FIG. 4. That is, the diagram (b) of FIG. 4 illustrates a network connection structure map including a private network formed by a router. As shown in the diagram (b), IP TV settop box 310 and router 320 are directed connected to modem 360. VoIP phone 330 is indirectly connected to modem 360 through router 320. Furthermore, unknown devices (e.g., 340 and 360) are also indirectly connected to modem 360 through router 320. Each one of settop box 310 and VoIP telephone 330 may be highlighted, blocked with a solid line or a dotted line, or have different color indicating an operation state thereof, such as a normal state or an abnormal state. After the generation, the network connection structure map of FIG. 4 and the network connection structure table may be provided to the tech operator or the subscriber.

As described, service server 100 may be coupled to a communication network at a remote location and determine a network connection structure of active devices in a target service place in accordance with at least one embodiment. Hereinafter, such a service server will be described with reference to FIG. 3.

Figure 3:
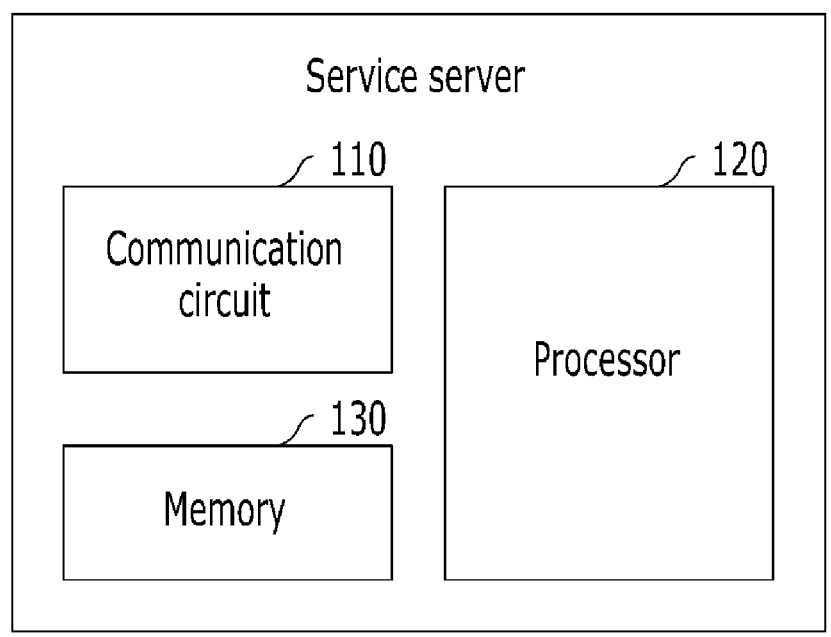
FIG. 3 illustrates a service server in accordance with at least one embodiment.

FIG. 3 illustrates a service server in accordance with at least one embodiment.

Referring to FIG. 3, service server 100 may be a computing system of a corresponding service provider, which responses to requests across a computer network, or help to provide, a predetermined service. In accordance with at least one embodiment, service server 100 may receive an inspection request message from at least one of a subscriber or a tech operator, collect basic network information of a target subscriber from network devices, determine a network connection structure of the target subscriber's devices, inspect the target subscriber's devices based on the determined network connection structure, and identifies a malfunctioning device among the devices.

In particular, service server 100 may include communication circuit 110, processor 120, and memory 130. Communication circuit 110 may establish a communication link to at least one of L3 device 210, L2 device 220, device 500, subscriber's devices 310 to 350. Through the established link, communication circuit 110 may receive information from or transmit information to at least one of L3 device 210, L2 device 220, device 500, subscriber's devices 310 to 350. For example, communication circuit 211 perform communication based on Digital Subscriber Line (xDSL), Hybrid Fiber Coaxial (HFC), Power Line Communication (PLC), satellites, GSM EDGE Radio Access Network (GERAN), UMTS Terrestrial Radio Access Network (UTRAN), evolved UMTS Terrestrial Radio Access Network (eUTRAN), Wireless Local Area Network (WLAN), and Worldwide Interoperability for Microwave Access (Wi-MAX), or a mobile communication network based on CDMA/WCDMA or GSM/GPRS.

In accordance with at least one embodiment, communication circuit 110 may receive an inspection request message from device 500, and transmit at least one of a request message and a control message for requesting a MAC address table, an ARP table, a router's management table, and so forth. Communication circuit 110 may receive a MAC address table from a L2 device, an ARP table from a L3 device, a router's management table from a router, or subscriber information from a server (not shown) associated with the service provider. Communication circuit 110 may store the received information in memory 130 or deliver the received information to processor 120 for performing operations.

Memory 130 is data storage storing information necessary for driving service server 100 and performing certain operation upon generation of a predetermined event. Such information may include any software programs and related data. Memory 130 may be a flash memory, hard disk, multimedia card micro memory, SD or XD memory, Random Access Memory (RAM), Static Random Access Memory (SRAM), Read-Only Memory (ROM), Programmable Read-Only Memory (PROM), Electrically Erasable Programmable Read-Only Memory (EEPROM), magnetic memory, magnetic disk, or optical disk, but is not limited thereto.

In accordance with at least one embodiment, memory 130 may store information received from other entities, such as a MAC address table, an APR table, a management table, and subscriber information. Furthermore, memory 130 may store information generated by certain operation, such as network connection structure tables and network connection maps.

Processor 120 may control overall operation of the constituent elements of service server 100. In accordance with at least one embodiment, processor 120 may perform operations for i) collecting basic network information on a subscriber's devices in a target service place from network devices of a corresponding service provider, ii) configuring a hierarchical network connection structure of the devices based on the collected information, iii) producing a network map of the devices in the target service place based on the hierarchical network connection structure, and iv) inspecting the devices based on the generated network map in accordance with at least one embodiment.

Since such operations of service server 100, which are performed through processor 120, are already described in detail with reference to FIG. 2, operations of processor 120 will be briefly described. For example, processor 120 may perform an operation for collecting subscriber information on a target subscriber when an inspection request message. Based on the subscriber information, processor 120 may perform an operation for determining associated L2 device and L3 device. Processor 120 may perform an operation for transmitting a request message to L2 device and L3 device for a MAC address table and an ARP table. Base on the MAC address table, processor 120 may determine active devices of the target subscriber. Based on the ARP table, process or 120 may determine IP addresses of the detected active devices. Processor 120 may perform an operation for obtaining a service server's management table. Based on the management table, processor 120 may detect types of the detected active devices.

Then, processor 120 may perform an operation for determining a router is included in the target service place based on the collected basic network information of the target subscriber. When the router is not included, processor 120 may perform operation for generating a network connection structure table based on the collected basic information.

When the router is included, processor 120 may perform an operation for obtaining a router's management table. Based on the router's management table, processor 120 may perform an operation for detecting devices coupled to a private network formed by the router. Such devices coupled to the private network are invisible to outside the private network. Processor 120 may perform an operation for inspecting the detected active devices in the target service place and update the network connection structure table with the inspection results such as a normal state, a malfunctioning state, and so forth. Based on the updated network connection structure table, processor 120 may perform operation for producing a network connection map as shown in FIG. 4.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of determining a network connection structure of devices in a target service place by a service server including a processor and a memory and located at a remote location from the target service place, the method comprising:
    obtaining subscriber information of a target subscriber;
    collecting public network information associated with the target subscriber from predetermined network devices associated with the target subscriber;
    detecting first devices belonging to the target subscriber and located in the target subscriber's service place based on the obtained subscriber information and the collected network information; and
    determining Internet Protocol (IP) addresses of the detected first devices based on the collected public network information, wherein the IP addresses of the detected first devices are determined by comparing a multiple access control (MAC) address table and an address resolution protocol (ARP) table, which are included in the public network information.

2. The method of claim 1, wherein the obtaining comprises:
    extracting identification information on the target subscriber from an inspection request message for requesting inspection of a service place of the target subscriber; and
    obtaining the subscriber information based on the extracted identification information.

3. The method of claim 2, wherein:
    the subscriber information is collected and stored when the target subscriber registers for a communication service;
    the subscriber information includes identification information of the target subscriber, information on the predetermined network devices having at least one port allocated to the target subscriber; and
    the identification information includes at least one of a telephone number, a subscriber number assigned by a corresponding service provider when the target subscriber registers for a corresponding communication service, and a physical address of the target service place.

4. The method of claim 1, wherein the collecting the public network information comprises:
    determining a layer 2 (L2) device and a layer 3 (L3) device associated with the target subscriber, as the predetermined network devices, based on the obtained subscriber information of the target subscriber; and
    obtaining a multiple access control (MAC) address table from the determined L2 device and obtaining an address resolution protocol (ARP) table from the determined L3 device, as the public network information of the target subscriber.

5. The method of claim 4, wherein the determining a L2 device and a L3 device comprises:
    obtaining information on an Internet Protocol address of the L2 device, information on the L3 device coupled to the L2 device, and information on at least one port of the L2 allocated to the target subscriber.

6. The method of claim 1, wherein the detecting comprises:
    determining a port allocated to the target subscriber based on the obtained subscriber information;
    selecting devices associated with the allocated port based on the collected public network information; and
    identifying the selected devices as the first devices belonging to the target subscriber and located in the target subscriber's service place.

7. The method of claim 6, wherein in the selecting, the collected public network information includes a multiple access control (MAC) address table having information on MAC addresses of devices coupled to at least one of the predetermined network devices and port numbers associated with the devices coupled to at least one of the predetermined network devices.

8. The method of claim 1, further comprising:
    obtaining private network information from at least one of the detected first devices belonging to the target subscriber; and
    detecting second devices belonging to the target subscriber and located in the target subscriber's service place based on the obtained private network information.

9. The method of claim 8, wherein:
    the private network information is a router's management table; and
    the router's management table includes information on devices coupled to a router belonging to the target subscriber and target subscriber's service place.

10. The method of claim 8, wherein the obtaining private network information comprises:
    determining whether the router is included in the first devices;
    collecting the private network information from the router when the router is included in the first devices; and
    otherwise, generating a network connection structure table based on the first devices.

11. The method of claim 8, further comprising:
    generating a network connection structure table based on the first devices and the second devices;
    inspecting the first devices and the second devices based on the generated network connection structure table; and
    updating and providing the network connection structure table based on the inspecting results of the first devices and the second devices.

12. The method of claim 8, further comprising:
    producing and providing a network connection map based on the network connection structure table.

13. The method of claim 1, wherein the detecting comprises:
obtaining a management table stored and managed by the service server; and
determining device types of the detected first devices based on the obtained management table and the collected public network information.

14. The method of claim 13, further comprising:
determining whether a router is included in the target subscriber's service place; and
when the router is included, collecting private network information from the router and detecting second devices based on the collected private network information.

15. The method of claim 1, further comprising:
generating a network connection structure table based on the detected first devices;
inspecting the first devices based on the generated network connection structure table;
updating and providing the network connection structure table based on the inspecting results of the first devices and the second devices; and
generating and providing a network connection structure map based on the updated network connection structure table.

16. The method of claim 15, wherein the inspecting comprises:
performing a ping test using Internet Protocol (IP) addresses of the first devices; and
determining an operation state of each one of the first devices based on the result of the ping test.

17. A method of determining a network connection structure of devices in a target service place by a service server including a processor and a memory and located at a remote location from the target service place, the method comprising:
obtaining subscriber information of a target subscriber;
collecting public network information associated with the target subscriber from predetermined network devices associated with the target subscriber;
detecting first devices belonging to the target subscriber and located in the target subscriber's service place based on the obtained subscriber information and the collected network information;
obtaining private network information from at least one of the detected first devices belonging to the target subscriber;
detecting second devices belonging to the target subscriber and located in the target subscriber's service place based on the obtained private network information;
generating a network connection structure table based on the first devices and the second devices;
inspecting the first devices and the second devices based on the generated network connection structure table;
updating and providing the network connection structure table based on the inspecting results of the first devices and the second devices;
performing a ping test using Internet Protocol (IP) addresses of the first devices and the second devices;
determining an operation state of each one of the first devices and the second devices based on the result of the ping test; and
determining Internet Protocol (IP) addresses of the detected first devices based on the collected public network information, wherein the IP addresses of the detected first devices are determined by comparing a multiple access control (MAC) address table and an address resolution protocol (ARP) table, which are included in the public network information.

18. The method of claim 17, wherein the obtaining comprises:
extracting identification information on the target subscriber from an inspection request message for requesting inspection of a service place of the target subscriber; and
obtaining the subscriber information based on the extracted identification information.

\* \* \* \* \*